United States Patent Office 3,436,199
Patented Apr. 1, 1969

3,436,199
PROCESS FOR REJUVENATING SPENT
GLASS POLISHING AGENTS
Walter L. Silvernail, West Chicago, Ill., assignor to Kerr-McGee Corporation, a corporation of Delaware
No Drawing. Filed July 15, 1964, Ser. No. 382,951
Int. Cl. B24d 17/00
U.S. Cl. 51—293          5 Claims

ABSTRACT OF THE DISCLOSURE

A process for increasing the polishing efficiency of spent glass polishing slurries. A spent polishing slurry is contacted with a flocculating agent to cause the solids in the slurry to coalesce or flocculate. The flocculated solids are washed and redispersed with water to provide a rejuvenated glass polishing slurry.

---

This invention relates to the art of glass polishing. More particularly, this invention relates to a process for rejuvenating spent glass polishing agents.

Glass polishing operations, in general, comprise the procedure of contacting the article to be polished with a moving lap which has been wetted with a glass polishing slurry. This procedure is carried out with continuous recycle of the glass polishing slurry. After a period of continuous operation, generally several weeks, the effectiveness of the glass polishing slurry decreases. As the effectiveness of the glass polishing slurry decreases, longer and longer times are required to accomplish the same polishing operation.

Previously, it generally was necessary to recharge the slurry with fresh polishing compound and eventually to discard spent glass polishing slurry. This was necessary because its effectiveness decreased to the point where the polishing rate was no longer acceptable.

The present invention provides for the recovery and rejuvenation of spent glass polishing slurries.

Broadly, the process of the present invention comprises contacting a spent glass polishing slurry with an effective amount of a flocculating agent to cause the solids in the slurry to coalesce or flocculate. The flocculated solids are washed and redispersed with water to provide a rejuvenated glass polishing slurry.

The effectiveness of a glass polishing slurry may be expressed as the polishing efficiency. Polishing efficiency is expressed in terms of the rate of glass removal when a weighed glass lens is polished in a standard commercial bowl feed polisher under specified conditions. As used herein, the polishing efficiency corresponds to the corrected average weight loss, in milligrams per minute, when a 54 mm. plano glass lens is polished on a 4 inch diameter felt polishing lap, revolving at 450 r.p.m., in a standard bowl feed polisher, with the lens held against the lap at a pressure of 0.2 kg./cm.$^2$. The corrected polishing efficiency values vary from the actual values in that allowance is made for variations resulting from the degree of conditioning of the felt lap and the position of the lens blank on the lap. The corrections are made by comparing the actual removal rates to the removal rate observed when a sample designated as a standard is used under the same conditions.

Commercially acceptable polishing efficiences, S, range as low as about 2. Preferably, the polishing efficiency of a glass polishing slurry is at least about 2.4 and most commercial rare earth glass polishing slurries have a polishing efficiency of at least about 3.6.

The exact mechanism by which a glass polishing slurry decreases in efficiency is not known. It is an observed fact that the activity of the polishing agent gradually decreases in polishing systems where the polishing agent is recirculated continuously. Likewise, the mechanism by which this invention rejuvenates the spent glass polishing agent is not thoroughly understood. This process rapidly and efficiently restores the glass polishing agent to substantially its initial effectiveness. There is apparently no limit to the number of times that a glass polishing agent may be rejuvenated and returned to substantially its original effectiveness, according to this process.

In the specification, claims, and following specific examples, all parts and percentages are by weight unless otherwise indicated. The following examples are set forth to further illustrate, not to limit, the invention.

Example I

This example is illustrative of the rejuvenation of rare earth oxide polishing agents at a basic pH.

A 900 ml. portion of a spent aqueous polishing slurry of polishing grade rare earth oxide dispersed in water has a specific gravity of 6.4° Bé., a pH of 9.0, and a polishing efficiency of 2.92 mg./min. This slurry is treated with 17 ml. of a 0.2 weight percent aqueous solution of water soluble polyethylene oxide. Immediately upon the addition of the coagulant, the slurry flocculates. The flocs are allowed to settle, leaving a milky supernate. The settled flocs are washed by decantation with 4 volumes of water. The volume of the slurry is adjusted to 900 ml. and the flocs are redispersed by agitation to produce a rejuvenated slurry. The specific gravity of the rejuvenated slurry is 4° Bé. and the polishing efficiency is 3.54 mg./min.

Example II

This example is illustrative of the rejuvenation of rare earth oxide polishing agents at an acid pH.

The pH of a 900 ml. portion of a polishing slurry, containing polishing grade rare earth oxide dispersed in water, is adjusted, with nitric acid, to a value of 3. The specific gravity of this slurry, prior to acidification, is 6.4° Bé. and the polishing efficiency is 2.92 mg./min. This slurry is treated with 20 ml. of a 0.2 weight percent aqueous solution of polyethylene oxide. Flocculation takes place immediately, leaving a clear supernate. The settled flocs are washed by decantation with 5 volumes of water. The volume is then adjusted to 900 ml. and the flocs are redispersed by agitation. The washed slurry has a pH of 7.0, a specific gravity of 5.6° Bé. and a polishing efficiency of 3.98 mg./min. The clear supernate resulting from the flocculation of the acidified slurry gives a gelatinous precipitate when made basic. This gelatinous precipitate is identified as silica, presumably accumulated in the slurry during the glass polishing cycle.

Equivalent results are obtained when this example is repeated using water soluble polyacrylamide and water soluble polyamine, respectively, as the flocculants.

Very satisfactory results are obtained when polishing slurries containing cerium oxide, zirconium oxide, and iron oxide, respectively, are treated according to this example.

In general, the concentration of the flocculant ranges from about 50 to 1000 parts per million parts of the solids in the spent glass polishing slurry.

This process is applicable to the treatment of glass polishing slurries which have not had their pH values adjusted from those which obtain during the polishing process. However, preferably, the pH of the spent glass polishing slurry is adjusted to a value between about 5 and 7 before the flocculant is added.

This process is applicable to spent glass polishing slurries of any concentration. In general, these slurries contain between about 2 and 50 weight percent of the polishing agent dispersed in water.

This process is generally applicable to any of the commercially available polishing agents which are used in the form of a glass polishing slurry.

Suitable flocculating agents for use in this process include, for example, water soluble polyethylene oxide glycol, one example of which is identified commercially as "Polyox Coagulant," water soluble high molecular weight polyacrylamide, one example of which is identified commercially as "Separan," water soluble high molecular weight polyalkylamines, one example of which is identified commercially as "Primafloc Coagulant," other water soluble polyalkylene oxides and the like. Mixtures of two or more flocculating agents may be used, if desired.

The flocculated solids produced in this process are generally washed several times with water before they are redispersed as a rejuvenated glass polishing slurry. If the flocculated solids tend to become redispersed during washing, thus making washing more difficult, they may be reflocculated by the addition of a small amount of the flocculant to the wash water.

This invention provides an economical, simple and efficient process for rejuvenating spent glass polishing agents.

As will be understood by those skilled in the art, what has been described is the preferred embodiment of the invention; however, many modifications, changes, and substitutions can be made therein without departing from the scope and the spirit of the following claims.

What is claimed is:

1. A process for rejuvenating glass polishing agents comprising
    contacting a spent glass polishing slurry containing a glass polishing agent with an amount of flocculating agent effective to flocculate the solids in said slurry, said flocculating agent being selected from the group consisting of water soluble polyalkylene oxides, water soluble polyacrylamides, water soluble polyalkylamines, and mixtures thereof,
    separating said flocculated solids, and washing and redispersing said flocculated solids with water to provide a rejuvenated glass polishing slurry having an increased polishing efficiency.

2. The process of claim 1 wherein the pH of said spent glass polishing slurry is adjusted to a value between about 5 and 7 prior to contacting the same with said flocculating agent.

3. The process of claim 1 wherein from about 50 to 1000 parts of flocculating agent are used per million parts of solids in said spent glass polishing slurry.

4. The process of claim 1 wherein said glass polishing agent is selected from the group consisting of rare earth oxide, zirconium oxide and iron oxide.

5. In a glass polishing process employing a glass polishing slurry which is constantly recycled, the improvements comprising periodically rejuvenating said glass polishing slurry by
    contacting said slurry with an amount of a flocculating agent effective to flocculate the solids in said slurry, said flocculating agent being selected from the group consisting of water soluble polyalkylene oxides, water soluble polyacrylamides, water soluble polyamines, and mixtures thereof,
    separating said flocculated solids, and
    washing and redispersing said flocculated solids with water to provide a rejuvenated glass polishing slurry having an increased polishing efficiency.

References Cited

UNITED STATES PATENTS

| | | | |
|---|---|---|---|
| 3,020,231 | 2/1962 | Colwell et al. | 210—54 |
| 3,123,452 | 3/1964 | Harris et al. | 51—309 |
| 3,158,971 | 12/1964 | Best | 51—309 |
| 3,235,491 | 2/1966 | Rosenberg et al. | 210—54 |
| 3,257,081 | 6/1966 | Brown et al. | 210—52 |

DONALD J. ARNOLD, *Primary Examiner.*

U.S. Cl. X.R.

51—309; 264—37; 210—54